(12) United States Patent
Fuller et al.

(10) Patent No.: US 12,320,434 B2
(45) Date of Patent: Jun. 3, 2025

(54) STABILIZED CHECK VALVE

(71) Applicant: SPM Oil & Gas Inc., Fort Worth, TX (US)

(72) Inventors: Nadiya Fuller, Plano, TX (US); Brian C. Witkowski, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 19 days.

(21) Appl. No.: 18/365,351

(22) Filed: Aug. 4, 2023

(65) Prior Publication Data

US 2025/0043875 A1 Feb. 6, 2025

(51) Int. Cl.
*F16K 15/03* (2006.01)

(52) U.S. Cl.
CPC .................................. *F16K 15/03* (2013.01)

(58) Field of Classification Search
CPC .. F16K 15/034; F16K 15/03; Y10T 137/7903; Y10T 137/7898
See application file for complete search history.

(56) References Cited

U.S. PATENT DOCUMENTS

| | | | | |
|---|---|---|---|---|
| 1,577,637 A * | 3/1926 | Hess | ...................... | F16K 15/03 137/240 |
| 2,923,317 A * | 2/1960 | McInerney | ......... | F16K 27/0232 137/527.2 |
| 3,870,071 A * | 3/1975 | Graham | ................... | F16K 15/03 251/177 |
| 3,875,963 A * | 4/1975 | Buck | ....................... | F16K 15/03 137/556 |
| 3,897,804 A * | 8/1975 | Buck | ....................... | F16K 15/03 137/527.8 |
| 4,281,680 A * | 8/1981 | Ripert | .................... | F16K 15/034 137/454.2 |
| 4,967,790 A * | 11/1990 | Ganske | .................... | F16K 15/03 137/527.8 |
| 5,056,548 A * | 10/1991 | Mills | ....................... | F16K 15/03 137/527.2 |
| 5,671,769 A * | 9/1997 | Booth | ..................... | F16K 15/03 137/271 |
| 6,328,062 B1 * | 12/2001 | Williams | .............. | F16K 15/036 251/303 |
| 6,679,289 B2 | 1/2004 | Sisk | | |
| 8,978,695 B2 * | 3/2015 | Witkowski | .............. | F16K 15/03 137/15.19 |
| 10,890,265 B2 | 1/2021 | Fink | | |
| 2008/0308159 A1 * | 12/2008 | Stunkard | ............. | F16K 27/0209 137/315.33 |
| 2015/0027563 A1 | 1/2015 | Barton | | |

FOREIGN PATENT DOCUMENTS

EP 2518377 A1 10/2012
GB 329576 A * 5/1930

* cited by examiner

*Primary Examiner* — Jessica Cahill

(57) ABSTRACT

In some implementations, a check valve may include a hanger configured in a valve body in a position that is approximately parallel to a direction of flow, wherein the hanger includes a first mating surface on a bottom face of the hanger. The check valve may include a clapper rotatably connected to the hanger, wherein the clapper is configured to rotate between a closed position and an open position, wherein the clapper includes a second mating surface on a top face of the clapper, and wherein the first mating surface and the second mating surface are configured to form a mated interface when the clapper is in the open position.

20 Claims, 6 Drawing Sheets

STABILIZED CHECK VALVE

TECHNICAL FIELD

The present disclosure relates generally to valves and, for example, to a stabilized check valve.

BACKGROUND

A check valve (sometime referred to as a swing valve, a non-return valve, a one-way valve, or a flapper check valve) is a mechanical device designed to allow the flow of fluid in only one direction. The check valve may prevent backflow or reverse flow in a fluid passageway (e.g., a pipe), meaning the check valve stops the fluid from flowing in the opposite direction in the fluid passageway. When the fluid flows in the desired direction (forward flow) in the fluid passageway, the check valve opens allowing the fluid to pass through unrestricted. However, when the fluid flows in the opposite direction (reverse flow) in the fluid passageway, the check valve automatically closes, thereby blocking the passage of the fluid and preventing backflow.

In some examples, the fluid in the fluid passageway may experience dynamic flow conditions. The dynamic flow conditions (e.g., where the flow is turbulent and/or is associated with rapid changes in pressure and/or velocity) may place dynamic loads on one or more components of the check valve. The dynamic loads may cause the check valve to open and close rapidly in quick succession, resulting in chattering and vibrations. As another example, the dynamic loads may cause one or more movable elements of the check valve (such as a clapper or pin) to flutter or oscillate, leading to instability and inconsistent performance. The dynamic flow conditions may introduce stresses, cause fatigue failures, and/or cause premature wear of components of the check valve. For example, dynamic loads may cause vibrations in one or more movable components of the check valve may introduce additional stresses and/or cause premature wear of a pin (e.g., that enables a movement of the one or more movable components) and/or may cause the pin to contact component(s) of the fluid passageway (such as a valve body) causing damage to the component(s) of the check valve, such as the valve body.

The check valve of the present disclosure solves one or more of the problems set forth above and/or other problems in the art.

SUMMARY

A check valve may include a hanger including a bottom face having a concave recess extending into the bottom face; and a clapper rotatably connected to the hanger, the clapper including a first rounded surface extending from a top face of the clapper, and a second rounded surface extending from a bottom face of the clapper, wherein the first rounded surface and the concave recess are configured to form a mated interface when the clapper is in an open position.

A check valve may include a valve body, wherein the check valve is configured to control a direction of flow of a fluid in the valve body; a hanger configured in the valve body in a position that is approximately parallel to the direction of flow, wherein the hanger includes a first mating surface on a bottom face of the hanger; and a clapper rotatably connected to the hanger, wherein the clapper is configured to rotate between a closed position and an open position, wherein the clapper includes a second mating surface on a top face of the clapper, and wherein the first mating surface and the second mating surface are configured to form a mated interface when the clapper is in the open position.

A check valve may include a hanger including a first mating surface on a bottom face of the hanger; and a clapper rotatably connected to the hanger, wherein the clapper is configured to rotate between a closed position and an open position, wherein the clapper includes a second mating surface on a top face of the clapper, and wherein the first mating surface and the second mating surface are configured to form a mated interface when the clapper is in the open position.

DETAILED DESCRIPTION

This disclosure relates to a check valve, which is applicable to any machine or system that utilizes a fluid passageway (e.g., a fluid passageway that includes a check valve). For example, the machine or system may be a flowline system, a fluid delivery system, a pump, a pump system, a hydraulic system, an air compressor, a hydraulic fracturing system, a pneumatic system, a fuel delivery system, an engine, a fire extinguisher, a fire sprinkler system, a fluid pipeline (e.g., an oil pipeline, a steam pipeline, or a gas pipeline), a sewage or wastewater system, an irrigation system, and/or another type of machine or system.

Figure 1:
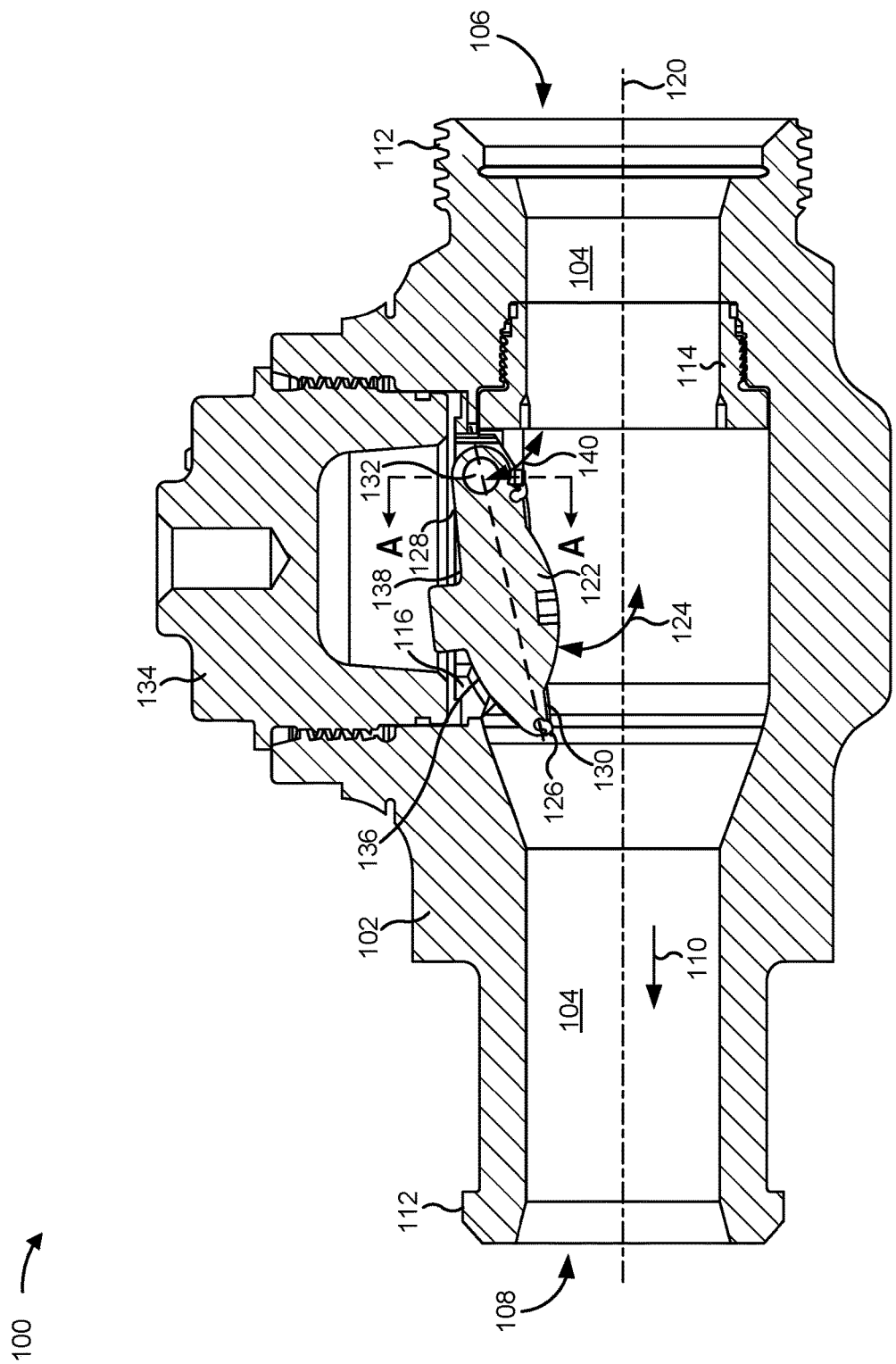
FIG. 1 is a diagram illustrating a cross-section view of an example check valve.

FIG. 1 is a diagram illustrating a cross-section view of an example check valve 100. The check valve 100 may be referred to as a clapper valve, a swing valve, a non-return valve, a one-way valve, and/or a flapper check valve, among other examples. The check valve 100 may be included in a machine or system, such as a flowline system or another machine or system in which a direction of fluid flow is controlled via the check valve 100.

The check valve 100 includes a valve body 102. The valve body 102 may form a fluid passageway 104 through which fluid is permitted to flow. The valve body 102 may include an inlet 106 and an outlet 108. For example, the check valve 100 may be configured to enable fluid to flow from the inlet 106 to the outlet 108 (e.g., in a direction of flow 110). The check valve 100 may be configured to prevent fluid from flowing from the outlet 108 to the inlet 106 (e.g., in a direction opposite the direction of flow 110). The check valve 100 may include one or more flowline connectors 112. The one or more flowline connectors 112 may be located proximate to the inlet 106 and the outlet 108. The one or more flowline connectors 112 are adapted to couple the valve body 102 in a flowline so that fluid flow through the valve body 102 is permitted in the direction of flow 110 and prevented (or at least reduced) in a direction opposite the axial direction of flow 110. For example, the check valve 100 may be included in a flowline system (e.g., where the one or more flowline connectors are connected to respective flowlines).

The check valve 100 includes a valve seat 114 connected to the valve body 102. The check valve 100 includes a hanger 116 extending within the valve body 102 proximate the valve seat 14. For example, the hanger 116 may be configured in the valve body 102 in a position that is approximately parallel to the direction of flow 110 (e.g., parallel to an axis 120 of the valve body 102 and/or the fluid passageway 104).

The check valve 100 includes a clapper 122. The clapper 122 may also be referred to as a flapper, a disc, a swing flap, and/or a moveable element, among other examples. The clapper 122 may be rotatably and/or pivotably connected to the hanger 116. For example, the clapper 122 may be rotatably and/or pivotably connected to the hanger 116 to enable the clapper 122 to be moveable from an open position (or open configuration) and a closed position (or a closed configuration). As shown by the arrow 124, the clapper 122 is configured to rotate between the open position and the closed position. The rotation may be caused by a flow of fluid through the fluid passageway 104. For example, as fluid flows in the direction of flow 110, a force of the fluid flow may cause the clapper 122 to move to the open position. As fluid flows in a direction opposite the direction of flow 110, force of the fluid flow may cause the clapper 122 to move to the closed position.

The open position is depicted in FIG. 1. For example, in the open position, fluid flow is permitted through the valve body 102 (e.g., in the direction of flow 110). In the closed position, the clapper 122 is seated against the valve seat 114 to at least partially (or fully) restrict fluid flow through the valve body 102. For example, in the closed position, the clapper 122 is seated against the valve seat 114 such that a seal 126 (e.g., position on the clapper 122) forms a seal with the valve seat 114 to at least partially (or fully) restrict fluid flow through the valve body 102 and/or through the fluid passageway 104.

The clapper 122 may include a top face 128 and a bottom face 130. The bottom face 130 of the clapper 122 is configured to face toward the direction of flow 110 in the valve body 102. The top face 128 of the clapper 122 is configured to face away from the direction of flow 110 when the clapper 122 is in the closed position. The clapper 122 may be a single unitary piece (e.g., as shown in FIG. 1). In some implementations, the clapper 122 may include multiple pieces connected to each other (e.g., the top face 128 may be included on a first piece of the clapper 122 and the bottom face 130 may be included on a second piece of the clapper 122).

The clapper 122 may be connected to the hanger 116 via a pin 132. For example, the clapper 122 and the hanger 116 may be connected via a pin connection that includes the pin 132. The check valve 100 may include a cap 134. The cap 134 may secure the hanger 116 in position relative to the valve seat 114. Additionally, the cap 134 may be removable (e.g., via a threaded connection with the valve body 102) to enable access to other components of the check valve 100, such as for maintenance and/or repair.

When the clapper is in the open position (e.g., as shown in FIG. 1), the clapper 122 may be configured to contact the hanger 116 to form a mated interface 136. For example, the mated interface 136 may be between the top face 128 of the clapper 122 and a bottom face 138 of the hanger 116. As described in more detail elsewhere herein, the mated interface 136 may be associated with increased surface area due to one or more mating surfaces on the clapper 122 and/or the hanger 116. The increased surface area increases friction at the mated interface 136, thereby reducing the movement of the clapper 122 and/or the pin 132 when the clapper 122 is in the open position.

In some implementations, an angle 140 between the open position and the closed position of the clapper 122 satisfies a threshold. For example, the angle 140 may be close to 90 degrees. The threshold may be 85 degrees, 87.5 degrees, and/or another value close to 90 degrees. Increasing the angle 140 (e.g., to be close to 90 degrees) may reduce forces and/or stress placed on the clapper 122 (e.g., caused by fluid flow through the fluid passageway 104), thereby reducing wear on the clapper 122. In some implementations, the increased angle (e.g., the angle 140) may be enabled via one or more features on the bottom face 130 of the clapper 122, as described in more detail elsewhere herein.

As indicated above, FIG. 1 is provided as an example. Other examples may differ from what is described with regard to FIG. 1.

Figure 2:
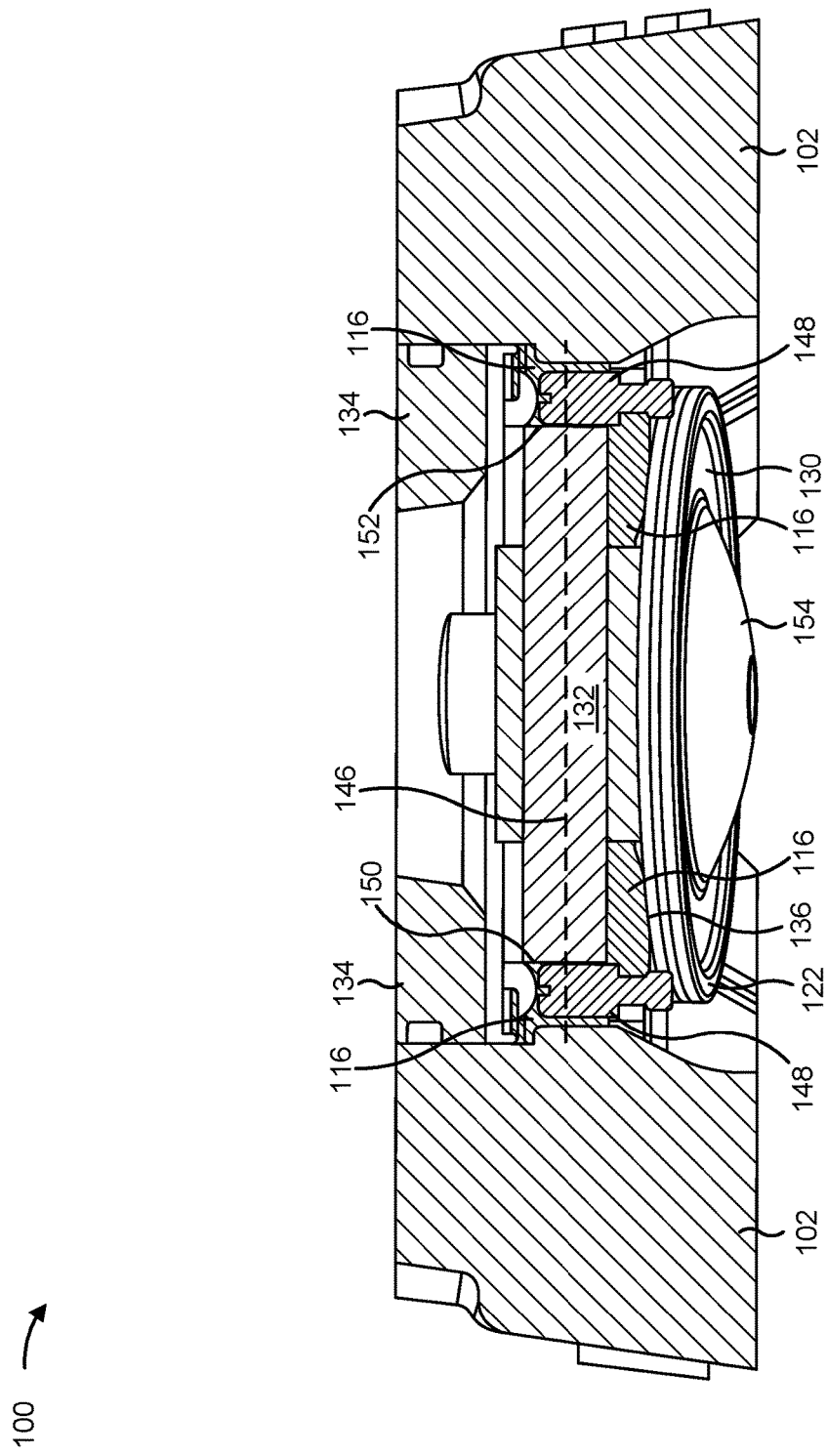
FIG. 2 is a diagram illustrating a cross-section view of the example check valve.

FIG. 2 is a diagram illustrating a cross-section view of the example check valve 100. The cross-section view is of the cross-section A-A depicted in FIG. 1.

As shown in FIG. 2, the pin 132 is configured to rotatably connect the hanger 116 and the clapper 122. For example, the hanger 116 includes a bore 142 (e.g., shown in more detail in FIGS. 3, 5, and 6). The pin is configured within the bore 142 to rotatably connect the hanger 116 and the clapper 122. The clapper 122 may include a bore 144 (e.g., a second bore, shown in more detail in FIGS. 3 and 4). The pin 132 is configured within the bore 142 and the bore 144. For example, the pin 132 is configured to pass through the bore 142 and the bore 144 to enable the clapper 122 to rotate about an axis 146 defined by the pin 132, the bore 142, and/or the bore 144.

The check valve 100 includes one or more setting members 148. The one or more setting members 148 extend through the hanger 116 (e.g., to reduce a movement of the pin 132). In one example, the check valve 100 may include two setting members 148. For example, a first setting member 148 may be configured at (or near) a first end 150 of the pin 132 and a second setting member 148 may be configured at (or near) a second end 152 of the pin 132. A setting member 148 may be a pin, a screw, a set screw, a bolt, a rivet, a threaded insert, and/or another mechanical component.

The one or more setting members 148 extend into the bore 142 (e.g., of the hanger 116) and form one or more interfaces with the pin 132. For example, a first interface between a first setting member 148 and the first end 150 of the pin 132 is formed. Additionally, a second interface between a second setting member 148 and the second end 152 of the pin 132 is formed. The one or more interfaces (e.g., the first interface and the second interface) may at least partially restrict a movement of the pin 132. For example, the one or more interfaces (e.g., the first interface and the second interface) may at least partially restrict a movement of the pin 132 along the axis 146 (e.g., in directions parallel to the axis 146). As a result, a likelihood that the pin 132 contacts the valve body 102 during operation is reduced.

The clapper 122 may include one or more features 154 on the bottom face 130. The one or more features 154 may facilitate a mating between the top face 128 of the clapper 122 and the bottom face 138 of the hanger 116 (e.g., the one or more features 154 may facilitate the forming of the mated interface 136 when the clapper 122 is in the open position shown in FIGS. 1 and 2). The one or more features 154 extend from (e.g., extend away from) the bottom face 130. As an example, the one or more features 154 include a rounded surface extending from the bottom face 130 of the clapper 122. The rounded surface may be a spherical surface. In other examples, the one or more features may have a different shape and/or geometry extending away from the bottom face 130 of the clapper 122. The one or more features 154 may increase a force placed on the clapper 122 when fluid flows through the fluid passageway 104 in the direction of flow 110. For example, the rounded surface extending from the bottom face 130 may increase the force placed on the clapper 122 when fluid flows through the fluid passageway 104 in the direction of flow 110. This increased force improves the connection (e.g., increases the force at) the mated interface 136, thereby reducing movement of one or more components of the check valve 100 when the clapper 122 is in the open position. Additionally, this increased force enables the angle 140 to be larger (e.g., closer to 90 degrees), thereby reducing wear on the clapper 122. As another example, the rounded surface (e.g., the spherical surface) extending from the bottom face 130 of the clapper 122 may reduce wear on the seal 126. For example, the rounded surface (e.g., the spherical surface) extending from the bottom face 130 of the clapper 122 may re-route or re-direct flow of fluid through the fluid passageway 104 away from the seal 126, thereby reducing wear on the seal 126. For example, rounded surface (e.g., the spherical surface) extending from the bottom face 130 of the clapper 122 may cause fluid to flow away from the seal 126 (e.g., thereby reducing a velocity of the fluid at a boundary with seal 126).

As indicated above, FIG. 2 is provided as an example. Other examples may differ from what is described with regard to FIG. 2.

Figure 3:
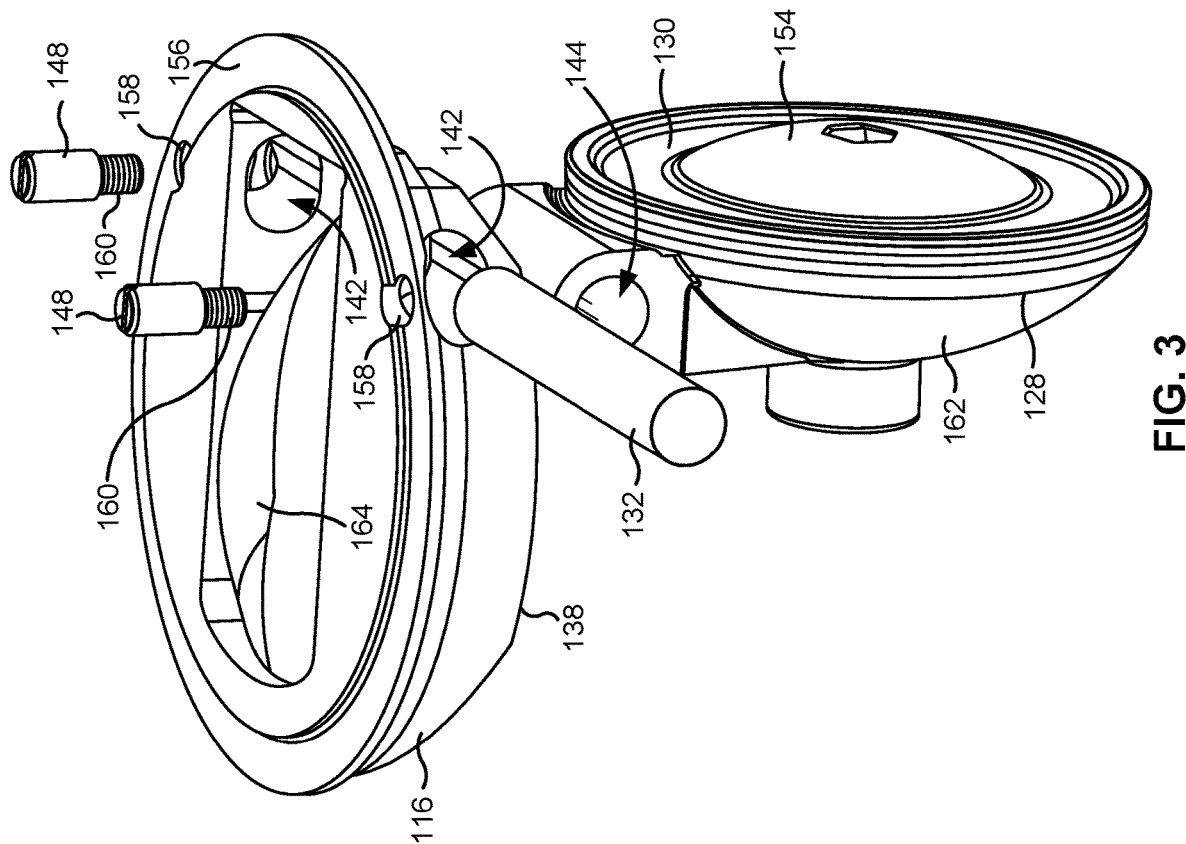
FIG. 3 is a diagram illustrating an exploded view of the example check valve.

FIG. 3 is a diagram illustrating an exploded view of the example check valve 100. FIG. 3 depicts the clapper 122 in an orientation associated with the closed position of the clapper 122 (e.g., the closed configuration or closed position of the check valve 100).

The one or more setting members 148 may pass through a top face 156 of the hanger 116. For example, the top face 156 may include one or more apertures 158 to enable the one or more setting members 148 to be configured in the bore 142. A setting member 148 may include a threaded portion 160. The threaded portion 160 may be threaded into a corresponding threaded hole (or tapped hole) in the hanger 116 (e.g., to fix the setting member 148 in place within the bore 142). In other examples, different means (e.g., other than threads) may be used to fix a position of the one or more setting members 148, such as a nut, a clip, an adhesive, a clamp, a magnet, a weld, and/or another means. Therefore, when configured within the bore 142 (e.g., after the pin 132 has been configured within the bore 142 and the bore 144), the one or more setting members 148 may at least partially restrict or prevent a movement of the pin 132 (e.g., along the axis 146).

The clapper 122 and the hanger 116 may include one or more mating surfaces associated with forming the mated interface 136. For example, the clapper 122 includes a first mating surface 162. The hanger 116 includes a second mating surface 164. The first mating surface 162 and the second mating surface 164 may include corresponding geometry (e.g., to increase a surface area of the mated interface 136 as compared to an interface between the top face 128 of the clapper 122 and the bottom face 138 of the hanger 116). For example, the first mating surface 162 is on the top face 128 of the clapper 122. The second mating surface 164 is on the bottom face 138 of the hanger 116. The first mating surface 162 extends from (e.g., extends away from) the top face 128 and the second mating surface 164 extends into the bottom face 138. In other examples, the first mating surface 162 extends into the top face 128 and the second mating surface 164 extends from (e.g., extends away from) the bottom face 138.

The first mating surface 162 and the second mating surface 164 may have corresponding geometries. For example, the first mating surface 162 and the second mating surface 164 may both be rounded surfaces, may both be rectangular surfaces, may both be hexagonal surfaces, and/or may both be surfaces having another geometry. As an example, as shown in FIG. 3, the first mating surface 162 and the second mating surface 164 may both be curved surfaces (e.g., spherical surfaces). For example, first mating surface 162 and the second mating surface 164 may be spherical surfaces. A spherical surface may be curved and/or rounded along a plurality of directions. A spherical surface may be curved and/or rounded 360 degrees around a central axis. In some implementations, a spherical surface may be a three-dimensional surface that has the shape of a sphere. For example, a spherical surface may have an approximately constant curvature at any point on the spherical surface.

For example, the first mating surface 162 is a rounded surface extending from the top face 128 of the clapper 122. In such examples, the second mating surface 164 is a concave recess extending into the bottom face 138 of the hanger 116. Alternatively, the first mating surface 162 is a concave recess extending into the top face 128 of the clapper 122 and the second mating surface 164 is a rounded surface extending from (e.g., extending away from) the bottom face 138 of the hanger 116. The rounded surfaces may be associated with increased surface area (e.g., when the mated interface 136 is formed) as compared to other geometries.

The rounded surface of the first mating surface 162 (e.g., rounded surface extending away from the top face 128 of the clapper 122) has a first radius. The rounded surface of the second mating surface 164 (e.g., the concave recess) has a second radius. The first radius and the second radius are within a tolerance. In other words, a difference between the first radius and the second radius satisfies a threshold (e.g., the difference may be less than or equal to the threshold). In some examples, the first radius and the second radius are the same. The first radius and the second radius being similar and/or the same increases the surface area of the mated interface 136.

As indicated above, FIG. 3 is provided as an example. Other examples may differ from what is described with regard to FIG. 3.

Figure 4:
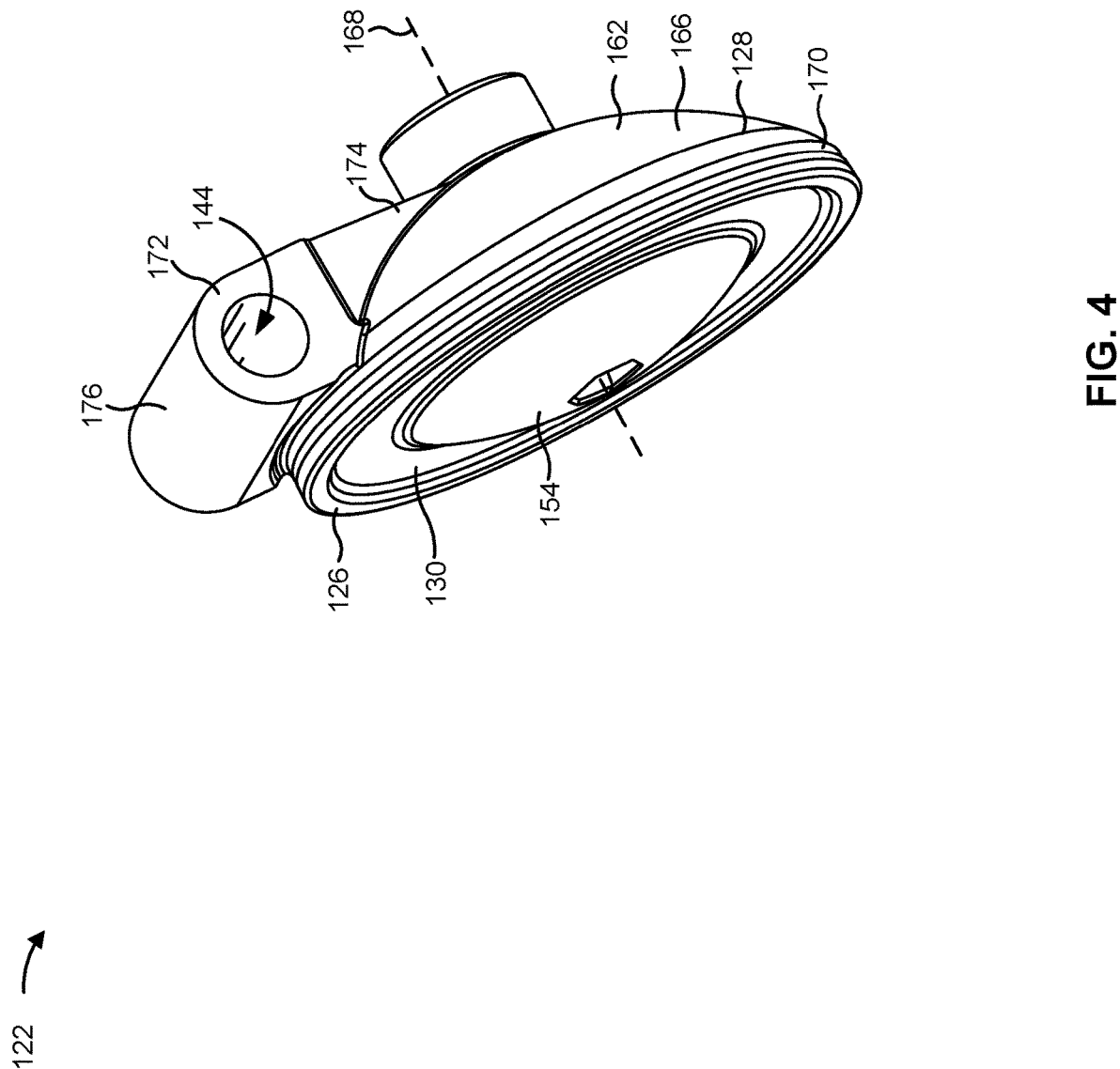
FIG. 4 is a diagram illustrating a perspective view of an example clapper.

FIG. 4 is a diagram illustrating a perspective view of an example clapper 122.

The clapper 122 includes a generally disk-shaped valve member 166 extending about a central axis 168. The valve member 166 includes a circumferentially-extending exterior surface 170 situated axially between the top face 128 and the bottom face 130. The exterior surface 170 delineates the outer periphery of the valve member 166.

The bottom face 130 may include the seal 126. For example, the bottom face 130 includes an external annular groove that is formed in the bottom face 130 and/or the exterior surface 170 of the valve member 166. The seal 126 is configured in the external annular groove (e.g., extends within the external annular groove) and includes a circumferentially-extending exterior surface extending adjacent the exterior surface 170 of the valve member 166.

The clapper 122 includes a hinge block 172. The hinge block 172 is connected to the valve member 166 at the top face 128. The hinge block 172 is integrally formed with the valve member 166. The hinge block 172 includes a proximal end portion 174, located at or near the central axis 168 of the valve member 166, and a distal end portion 176, extending radially beyond the exterior surface 170 of the valve member 166. The bore 144 (e.g., a generally cylindrical passageway) is formed through the hinge block 172 proximate the distal end portion 176. The bore 144 may extend approximately perpendicular to the central axis 168. The hinge block 172 is configured to extend between hinge blocks of the hanger 116 (e.g., depicted in FIGS. 5 and 6) so that the bore 144 of the clapper 122 is substantially aligned with the bore 142 of the hanger 116.

As indicated above, FIG. 4 is provided as an example. Other examples may differ from what is described with regard to FIG. 4.

Figure 5:
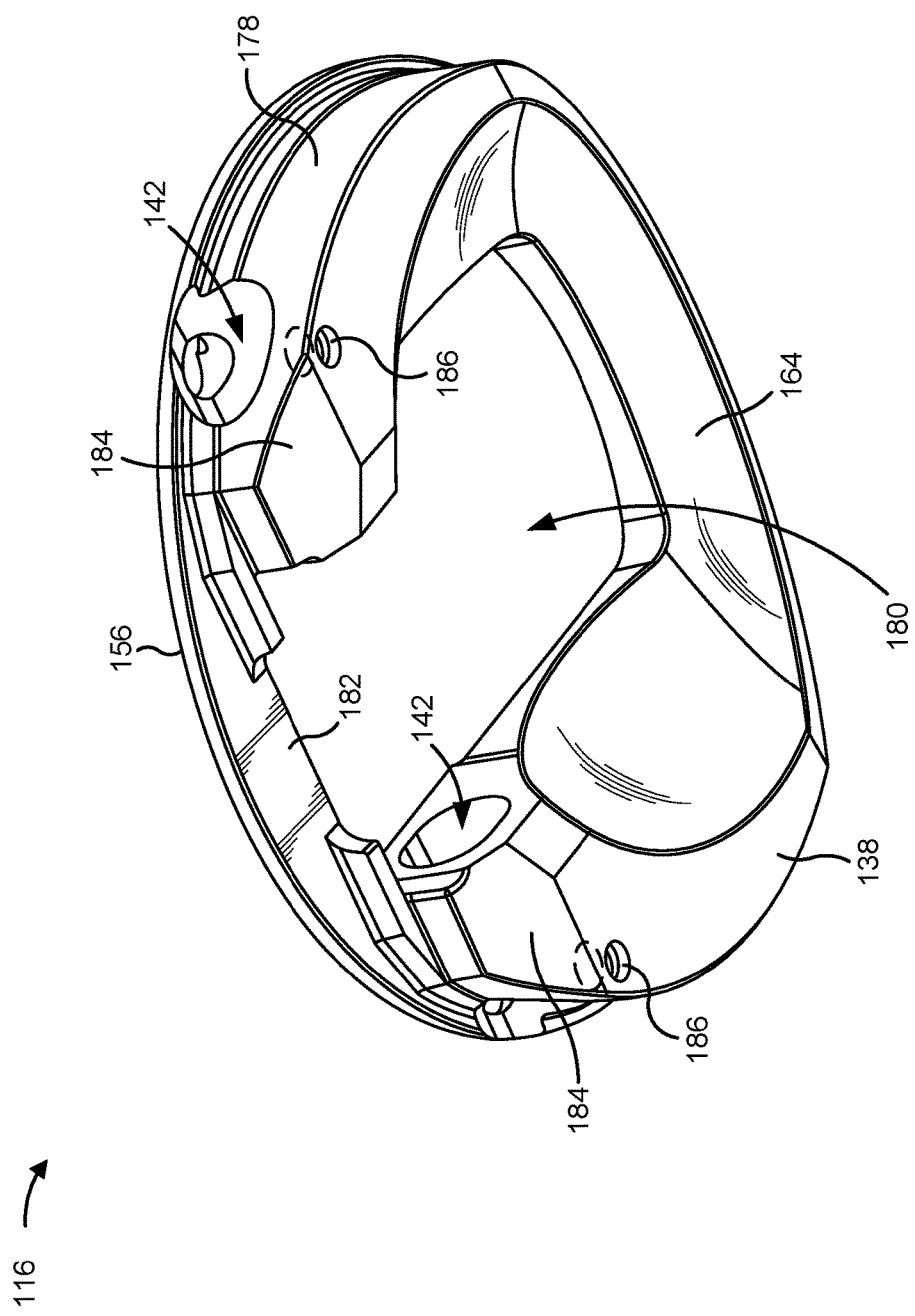
FIG. 5 is a diagram illustrating a perspective view of an example hanger.

FIG. 5 is a diagram illustrating a perspective view of an example hanger 116.

The hanger 116 includes a generally disk-shaped annular body 178 extending about a central axis. The annular body 178 includes a central opening 180, the bottom face 138, and the top face 156. An external lip 182 is formed in the periphery of the annular body 178. The external lip 182 may be a shoulder. The central opening 180 may enable access to other components of the check valve 100 (such as the clapper 122) when the check valve 100 is assembled (e.g., without disassembling the check valve 100). As shown elsewhere herein, a top portion of the clapper 122 (e.g., at least a portion of the first mating surface 162) may extend through the central opening 180 (e.g., when the clapper 122 is in the closed position). For example, the central opening 180 enables the top portion of the clapper 122 to fit with the hanger 116 when the clapper 122 is in the closed position.

The hanger 116 includes one or more hinge blocks 184. For example, as shown in FIG. 5, the hanger 116 includes two hinge blocks 184 separated by a distance. The bore 142 (e.g., a generally cylindrical passageway) may pass through each hinge block 184 of the hanger 116. For example, when configured, the hinge block 172 of the clapper 122 may be configured between the hinge blocks 184 of the hanger 116 such that the bore 142 aligns with the bore 144. The pin 132 may be configured within the aligned bores (e.g., the bore 142 and the bore 144) to rotatably connect the clapper 122 to the hanger 116.

Each hinge block 184 may include an aperture 186. A setting member 148 may be configured within an aperture 186 when the check valve 100 is configured. For example, the aperture(s) 186 may be threaded holes. The threaded portion 160 of the setting member 148 may be threaded into the aperture 186 to fix the setting member 148 in place. In other example, the threaded portion 160 may pass through the aperture 186 and another component (e.g., a nut or a clip) may fix the setting member 148 in place (e.g., via contact with the bottom face 138).

As shown in FIG. 5, the second mating surface 164 extends into the bottom face 138. For example, the second mating surface 164 is a concave surface or a rounded surface (e.g., a spherical surface) extending into the bottom face 138. The second mating surface 164 is configured to mate with the first mating surface 162 of the clapper 122 when the clapper 122 is in the open position. For example, the first mating surface 162 and the second mating surface 164 are configured to increase the surface area of the mated interface 136, as described in more detail elsewhere herein.

As indicated above, FIG. 5 is provided as an example. Other examples may differ from what is described with regard to FIG. 5.

Figure 6:
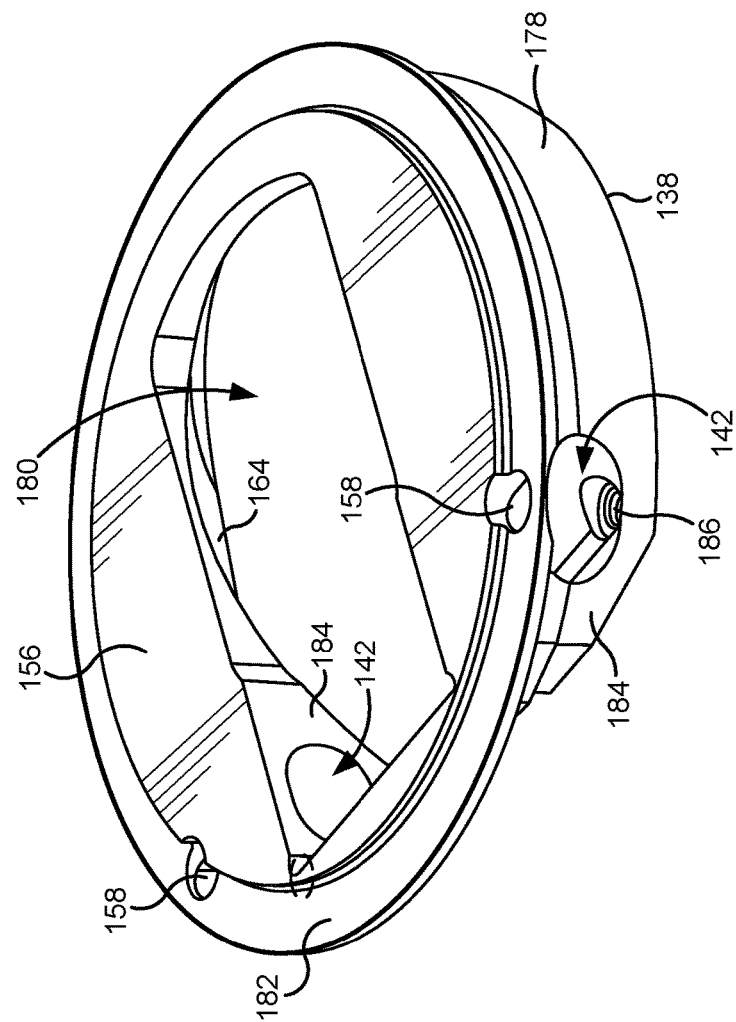
FIG. 6 is a diagram illustrating a perspective view of the example hanger.

FIG. 6 is a diagram illustrating a perspective view of the example hanger 116.

The second mating surface 164 (e.g., the concave recess) may extend from the bottom face 138 toward the top face 156 of the hanger 116. For example, the second mating surface 164 may extend into the annular body 178 of the hanger 116. In association with the first mating surface 162 extending from the top face 128 of the clapper 122, this increases the surface area of the mated interface 136 (e.g., between the clapper 122 and the hanger 116) when the clapper 122 is in the open position.

The top face 156 of the hanger 116 may include the one or more apertures 158. The one or more apertures 158 enable the one or more setting members 148 to be configured in the bore 142. For example, when the check valve 100 is assembled, a setting member 148 may pass through the aperture 158, be fixed via the aperture 186, and be configured in the bore 142 (e.g., the bore through a hinge block 184 of the hanger 116). The one or more apertures 158 may be generally cylindrical passageways from the top face 156 into the bore 142. As described elsewhere herein, when the one or more setting members 148 are fixed in the bore 142 (e.g., via the aperture(s) 158 and the aperture(s) 186), the one or more setting members 148 may at least partially restrict or prevent a movement of the pin 132 (e.g., in a direction that is parallel to an axis of the bore 142).

As indicated above, FIG. 6 is provided as an example. Other examples may differ from what is described with regard to FIG. 6.

INDUSTRIAL APPLICABILITY

In some examples, fluid in a fluid passageway of a check valve may experience dynamic flow conditions. The dynamic flow conditions (e.g., where the flow is turbulent and/or is associated with rapid changes in pressure and/or velocity) may place dynamic loads on one or more components of the check valve, such as a clapper, a hanger, and/or a pin. The dynamic loads may cause the check valve to open and close rapidly in quick succession, resulting in chattering and vibrations. As another example, the dynamic loads may cause one or more movable elements of the check valve (such as a clapper or pin) to flutter or oscillate, leading to instability and inconsistent performance. The dynamic flow conditions may introduce stresses, cause fatigue failures, and/or cause premature wear of components of the check valve. For example, dynamic loads may cause vibrations in one or more movable components of the check valve may introduce additional stresses and/or cause premature wear of a pin (e.g., that enables a movement of the one or more movable components) and/or wear of a bore in which the pin is configured. Additionally, the dynamic loads may cause vibrations in one or more movable components of the check valve may cause the pin to contact component(s) of the fluid passageway (such as a valve body) causing damage to the component(s) of the check valve (such as the valve body).

Some implementations described herein enable a stabilized check valve. For example, the check valve described herein may be stabilized in that a mating interface between the clapper and the hanger of the check valve is associated with increased surface area. The increased surface area may increase friction between the clapper and the hanger. The increased friction may stabilize a movement of the clapper (e.g., may reduce a movement of the clapper) when the clapper is in an open position (e.g., an under dynamic loads caused by fluid passing through the check valve). As a result, the reduced movement of the clapper may transfer loads and/or stresses from the pin (e.g., and/or from an interface between the pin and/or one or more bores) to the mating interface between the clapper and the hanger. This reduces wear of the pin and/or the one or more bores. By reducing the wear of the pin and/or the one or more bores, the check valve may experiences an improved lifespan. For example, by reducing the wear of the pin and/or the one or more bores, a likelihood of misalignment between the clapper and the valve body of the check valve when the clapper is in the closed position is reduced (e.g., improving the likelihood that a seal of the clapper is enabled to form an effective seal preventing fluid from flowing in an undesired direction through the check valve).

For example, the clapper may include a first mating surface and the hanger may include a second mating surface. When the clapper is in the open position, the first mating surface and the second mating surface may contact each other to form the mated interface. In some examples, the first mating surface may be a rounded surface extending from the top face of the clapper and the second mating surface may be a concave recess extending into the bottom face of the hanger. The mating surfaces may have corresponding geometries (e.g., one surface may extend away from a first component in a given geometry and the other surface may extend into a second component in the given geometry) to increase the surface area of the mated interface. For example, the given geometry may be a rounded or spherical geometry (e.g., which has a relatively increased surface area for the mated interface compared to other geometries). Moreover, by configuring the mated interface to be between the clapper and the hanger, stresses, wear, and/or forces caused by the fluid passing through the check valve may be isolated to replaceable components of the check valve. For example, by configuring the mated interface to be between the clapper and the hanger, a likelihood of additional wear and/or stresses to a valve body of the check valve (e.g., caused by moving components of the check valve) is reduced.

In some implementations, the clapper may include one or more features extending away from the bottom face of the clapper. For example, the clapper may include a rounded surface extending away from the bottom face of the clapper. The one or more features (e.g., the rounded surface) may increase a force on the clapper caused by fluid traveling through the check valve in an intended or permitted direction of flow. The increased force provides additional force to stabilize the clapper in the open position (e.g., via the additional friction at the mated interface). Further, the increased force enables an angle of the clapper (e.g., an angle between the open position and a closed position) to be increased (e.g., closer to 90 degrees). The increased angle reduces wear on the clapper caused by the fluid passing through the check valve.

In some implementations, the check valve may include one or more setting members. The one or more setting members are configured to at least partially reduce or prevent a movement of the pin of the check valve. By configuring the one or more setting members to at least partially reduce or prevent a movement of the pin, a likelihood that the pin contacts other components of the check valve (such as the valve body) is reduced. By reducing the likelihood that the pin contacts other components of the check valve, a likelihood of wear and/or premature failure of the pin and/or the other components is reduced.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "bottom," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A check valve, comprising:
   a hanger including a bottom face having a concave recess extending into the bottom face; and
   a clapper including:
   a first rounded surface extending from a top face of the clapper,
   a second rounded surface extending from a bottom face of the clapper, wherein the first rounded surface and the concave recess are configured to form a mated interface when the clapper is in an open position,
   a valve member including a circumferentially-extending exterior surface situated axially between the top face of the clapper and the bottom face of the clapper, and
   a hinge block, connected to the valve member at the top face of the clapper, configured to rotatably connect the clapper to the hanger.

2. The check valve of claim 1, further comprising:
   a pin configured to rotatably connect the hanger and the clapper.

3. The check valve of claim 2, further comprising:
   one or more setting members extending through the hanger to reduce a movement of the pin.

4. The check valve of claim 3, wherein the hanger includes a bore, wherein the pin is configured within the bore to rotatably connect the hanger and the clapper, and wherein the one or more setting members extend into the bore and form one or more interfaces with the pin.

5. The check valve of claim 1, wherein the check valve includes a valve body, and wherein the bottom face of the clapper is configured to face toward a direction of flow in the valve body and the top face of the clapper is configured to face away from the direction of flow when the clapper is in a closed position.

6. The check valve of claim 1, wherein the concave recess has a first radius, wherein the first rounded surface has a second radius, and wherein the first radius and the second radius are within a tolerance.

7. The check valve of claim 1, wherein an angle between the open position and a closed position of the clapper is at least 85 degrees.

8. A check valve, comprising:

a valve body, wherein the check valve is configured to control a direction of flow of a fluid in the valve body;

a hanger configured in the valve body in a position that is approximately parallel to the direction of flow, wherein the hanger includes a first mating surface on a bottom face of the hanger; and a clapper rotatably connected to the hanger, wherein the clapper is configured to rotate between a closed position and an open position, and wherein the clapper includes:

a valve member including a circumferentially-extending exterior surface situated axially between a top face of the clapper and a bottom face of the clapper, a hinge block, connected to the valve member at the top face of the clapper, configured to rotatably connect the clapper to the hanger, and a second mating surface on the top face of the clapper, wherein the first mating surface and the second mating surface are configured to form a mated interface when the clapper is in the open position.

9. The check valve of claim 8, wherein the top face of the clapper faces away from the direction of flow when the clapper is in the closed position.

10. The check valve of claim 8, wherein the first mating surface extends into the bottom face of the hanger, and wherein the second mating surface extends away from the top face of the clapper.

11. The check valve of claim 8, wherein the first mating surface is a first curved surface, and wherein the second mating surface is a second curved surface.

12. The check valve of claim 11, wherein the first curved surface has a first radius, wherein the second curved surface has a second radius, and wherein a difference between the first radius and the second radius satisfies a threshold.

13. The check valve of claim 8, wherein the check valve further comprises:

a pin configured to rotatably connect the hanger and the clapper, wherein the hanger includes a first bore, and the clapper includes a second bore, and wherein the pin is configured within the first bore and the second bore; and one or more setting members configured within the first bore, wherein the one or more setting members are configured to prevent a movement of the pin with respect to a direction that is parallel to an axis of the first bore.

14. The check valve of claim 8, wherein the clapper includes a surface extending away from the bottom face of the clapper.

15. The check valve of claim 14, wherein the surface is a spherical surface.

16. A check valve, comprising:

a hanger including a first mating surface on a bottom face of the hanger; and a clapper rotatably connected to the hanger, wherein the clapper is configured to rotate between a closed position and an open position, and wherein the clapper includes:

a valve member including a circumferentially-extending exterior surface situated axially between a top face of the clapper and a bottom face of the clapper, a hinge block, connected to the valve member at the top face of the clapper, configured to rotatably connect the clapper to the hanger, and a second mating surface on the top face of the clapper, wherein the first mating surface and the second mating surface are configured to form a mated interface when the clapper is in the open position.

17. The check valve of claim 16, wherein the first mating surface is a first spherical surface extending into the bottom face of the hanger, and wherein the second mating surface is a second spherical surface extending away from the top face of the clapper.

18. The check valve of claim 17, wherein the first mating surface has a first radius, and wherein the second mating surface has the first radius.

19. The check valve of claim 16, further comprising:

a pin configured to rotatably connect the hanger and the clapper, wherein the hanger includes an opening, and wherein the pin is configured within the opening; and one or more setting members configured to pass through the hanger and into the opening.

20. The check valve of claim 16, wherein the clapper includes a curved surface extending away from the bottom face of the clapper.

* * * * *